(12) United States Patent
Woo et al.

(10) Patent No.: US 8,531,446 B2
(45) Date of Patent: Sep. 10, 2013

(54) DC-DC CONVERTER AND CONTROLLING METHOD THEREOF, AND DISPLAY DEVICE USING THE SAME

(75) Inventors: Kyoungdon Woo, Kyungbuk (KR); Hyemin Park, Kyungnam (KR)

(73) Assignee: LG Display Co., Ltd., Seoul (KR)

( * ) Notice: Subject to any disclaimer, the term of this patent is extended or adjusted under 35 U.S.C. 154(b) by 523 days.

(21) Appl. No.: 12/827,394

(22) Filed: Jun. 30, 2010

(65) Prior Publication Data

US 2011/0157141 A1 Jun. 30, 2011

(30) Foreign Application Priority Data

Dec. 28, 2009 (KR) .................... 10-2009-0131986

(51) Int. Cl.
*G06F 3/038* (2013.01)

(52) U.S. Cl.
USPC ............ 345/212; 345/211; 323/282; 323/283

(58) Field of Classification Search
None
See application file for complete search history.

(56) References Cited

U.S. PATENT DOCUMENTS

| | | | | |
|---|---|---|---|---|
| 5,854,617 | A * | 12/1998 | Lee et al. ...................... | 345/102 |
| 6,316,881 | B1 * | 11/2001 | Shannon et al. ............... | 315/219 |
| 7,030,596 | B1 * | 4/2006 | Salerno et al. ................. | 323/282 |
| 7,061,213 | B2 * | 6/2006 | Yoshida ........................ | 323/224 |
| 7,382,114 | B2 * | 6/2008 | Groom .......................... | 323/271 |
| 7,777,473 | B2 * | 8/2010 | Hasegawa et al. ............. | 323/284 |
| 7,847,491 | B2 * | 12/2010 | Lin et al. ....................... | 315/307 |
| 2003/0227452 | A1 * | 12/2003 | Hartular ........................ | 345/211 |
| 2009/0218998 | A1 * | 9/2009 | Huang et al. .................. | 323/282 |
| 2009/0224745 | A1 * | 9/2009 | Yamada ........................ | 323/311 |
| 2009/0302817 | A1 * | 12/2009 | Nagai ............................ | 323/282 |
| 2010/0188061 | A1 * | 7/2010 | Ma et al. ....................... | 323/247 |
| 2010/0302289 | A1 * | 12/2010 | Park et al. ..................... | 345/691 |

FOREIGN PATENT DOCUMENTS

| | | |
|---|---|---|
| JP | 2000-050626 | 2/2000 |
| JP | 2000-208287 | 7/2000 |

OTHER PUBLICATIONS

Office Action dated Oct. 4, 2012 for corresponding JP patent application No. 2010-263122.

\* cited by examiner

*Primary Examiner* — Dismery Mercedes
(74) *Attorney, Agent, or Firm* — Morgan, Lewis & Bockius LLP

(57) ABSTRACT

A DC-DC converter comprises a burst mode circuit configured to work when a load connected to an output terminal of the DC-DC converter is a light load, and a PWM mode circuit configured to work when the load is a heavy load, wherein the burst mode circuit switches a voltage at the output terminal during a period of time when a feedback voltage from the output terminal reaches a high potential reference voltage, generates a switch start signal with frequencies divided by predetermined frequency division values, and switches the voltage at the output terminal in response to the switch start signal, and wherein the PWM mode circuit switches the voltage at the output terminal during a period of time when a ramp wave signal is greater than a difference voltage between the feedback voltage and a predetermined PWM mode reference voltage.

7 Claims, 13 Drawing Sheets

Vout

Vout

FIG. 11

|  | BURST MODE IN RELATED ART | BURST MODE IN THIS DOCUMENT | | | |
|---|---|---|---|---|---|
|  |  | n=1 | n=5 | n=7 | n=5&7 |
| 1 | WORK BY COMPARISON OF Vref_max AND Vref_min IRRESPECTIVE OF CLOCK | on | off | off | off |
| 2 | | on | off | off | off |
| 3 | | on | off | off | off |
| 4 | | on | off | off | off |
| 5 | | on | on | off | on |
| 6 | | on | off | off | off |
| 7 | | on | off | on | on |
| 8 | | on | off | off | off |
| 9 | | on | off | off | off |
| 10 | | on | on | off | on |
| 11 | | on | off | off | off |
| 12 | | on | off | off | off |
| 13 | | on | off | off | off |
| 14 | | on | off | on | on |
| 15 | | on | on | off | on |
| 16 | | on | off | off | off |
| 17 | | on | off | off | off |
| 18 | | on | off | off | off |
| 19 | | on | off | off | off |
| 20 | | on | on | off | on |
| 21 | | on | off | on | on |
| 22 | | on | off | off | off |
| 23 | | on | off | off | off |
| 24 | | on | off | off | off |
| 25 | | on | on | off | on |
| 26 | | on | off | off | off |
| 27 | | on | off | off | off |
| 28 | | on | off | on | on |
| 29 | | on | off | off | off |
| 30 | | on | on | off | off |
| 31 | | on | off | off | off |
| 32 | | on | off | off | off |
| 33 | | on | off | off | off |
| 34 | | on | off | off | off |
| 35 | | on | on | on | on |
| 36 | | on | off | off | off |
| 37 | | on | off | off | off |
| 38 | | on | off | off | off |
| 39 | | on | off | off | off |
| 40 | | on | on | off | on |

ACCUMULATED Vout RIPPLE

DC-DC CONVERTER AND CONTROLLING METHOD THEREOF, AND DISPLAY DEVICE USING THE SAME

This application claims the benefit of Korean Patent Application No. 10-2009-0131986 filed on Dec. 28, 2009, the entire contents of which is incorporated herein by reference for all purposes as if fully set forth herein.

BACKGROUND

1. Field

This document relates to a DC-DC converter and a controlling method thereof. In addition, this document relates to a display device which is driven by a power generated by the DC-DC converter and the controlling method thereof.

2. Related Art

Various kinds of electronic devices are required to be supplied with a stable direct current ("DC") power, and thus have a DC-DC converter. The DC-DC converter receives a DC power to generate a DC output. The DC-DC converter, which is driven by a voltage controlled method, adjusts a duty ratio based on variation of a load and regulates the DC output.

In order to reduce the standby power in the electronic devices, the DC-DC converter has a burst mode function for reducing switching losses when the load is low. The burst mode operation in the DC-DC converter is as shown in FIGS. 1 and 2.

Referring to FIGS. 1 and 2, the DC-DC converter includes first to third operational amplifiers AMP1 to AMP3, a logic unit 10, a driving unit 11, and a transistor Q1.

The first operational amplifier AMP1 compares a feedback voltage input to a feedback terminal FB with a high potential reference voltage Vref_max, and generates an output indicating whether the feedback voltage is higher or lower than the reference voltage Vref_max. The feedback terminal FB is applied with an output voltage divided by a voltage division resistor circuit. The second operational amplifier AMP2 compares a feedback voltage Vfb with a low potential reference voltage Vref_min, and generates an output indicating whether the feedback voltage is higher or lower than the reference voltage Vref_min. The third operational amplifier AMP3 compares with each other voltages at both ends of a resistor R connected between the transistor Q1 and a ground GND so as to detect a current flowing through the transistor Q1, and outputs the detected result to the logic unit 10.

The logic unit 10 receives the outputs from the first and second operational amplifier AMP1 and AMP2, and repeatedly generates switch-on pulses until the feedback voltage Vfb increases to the high potential reference voltage Vref_max after reaching the low potential reference voltage Vref_min. In addition, the logic unit 10 stops generating the switch-on pulses until the feedback voltage Vfb decreases to the low potential reference voltage Vref_min after reaching the high potential reference voltage Vref_max. The driving unit 11 turns on the transistor Q1 in response to the switch-on pulses from the logic unit 10. In FIG. 2, the reference numeral "SW" denotes a voltage at a switch terminal SW which varies depending on the turn-on/turn-off of the transistor Q1. The output voltage Vout is a voltage developed passing through the switch terminal SW, a diode (not shown), and so on.

When the DC-DC converter having the burst mode function as shown in FIGS. 1 and 2 is employed as a power converter in a display device so as to reduce power consumption in the display device, ripples of driving voltages supplied to a display panel (corresponding to the load) in the burst mode are heighten, whereby a viewer can recognize that images displayed in the display panel shake.

If a full white load where all the pixels in an organic light emitting diode (OLED) display emit light at the maximum brightness is assumed to be 100%, when a grayscale for data input to the OLED display is adjusted to be 30% and the DC-DC converter provides an output voltage in the burst mode to the display panel of the display device as a high potential driving voltage VDD, an image displayed in the OLED display at this time is as shown in FIG. 3. In this case, the ripple cycles of the high potential driving voltage VDD in the burst mode are seen by a viewer, and thereby the viewer can clearly recognize a screen shaking phenomenon.

When a grayscale for data input to the OLED display is reduced to 10% and the DC-DC converter provides an output voltage in the burst mode to the display panel of the display device as the high potential driving voltage VDD, an image displayed in the OLED display is as shown in FIG. 4. In this case, the ripple cycles are hardly seen by a viewer, and thereby the viewer a little recognizes the screen shaking phenomenon.

FIGS. 5 to 7 are waveform diagrams illustrating examples of waveforms of which ripple amplitudes of output voltages are the same and frequencies are different from each other. The DC power output from the DC-DC converter has much influence on brightness level and brightness uniformity. Brightness variation in the display device caused by the difference between ripple amplitudes of the DC power output from the DC-DC converter is scarcely seen with naked eyes of a viewer. In contrast, brightness variation in the display device caused by the time difference between a switching duration and a non-switching duration can be seen with naked eyes of a viewer depending on ripple frequencies of the DC power. For example, if the ripple frequency of the DC power output from the DC-DC converter is very high as shown in FIG. 5, or is very low as shown in FIG. 7, a viewer hardly recognizes the screen shaking. However, the viewer can recognize the screen shaking in the ripple frequency of the DC power output in the burst mode (FIG. 6).

The burst mode in the DC-DC converter is not applied when the display device is operated in a light load. Therefore, it is necessary to use a voltage output from the DC-DC converter in the burst mode as the standby power and prevent degradation of a display quality when the display device is operated in the light load.

SUMMARY

Embodiments of the present invention provide a DC-DC converter, a controlling method thereof, and a display device using the same, capable of reducing a standby power in a display device without degrading a display quality of the display device in a burst mode.

According to an exemplary embodiment of the present invention, there is provided a DC-DC converter comprising a burst mode circuit configured to work when a load connected to an output terminal of the DC-DC converter is a light load of which a load value is a predetermined threshold value or less; and a PWM mode circuit configured to work when the load is a heavy load of which the load value is greater than the threshold value.

The burst mode circuit switches a voltage at the output terminal during a period of time when a feedback voltage from the output terminal reaches a high potential reference voltage, generates a switch start signal with frequencies divided by predetermined frequency division values, and switches the voltage at the output terminal in response to the switch start signal.

The PWM mode circuit switches the voltage at the output terminal during a period of time when a ramp wave signal is greater than a difference voltage between the feedback voltage and a predetermined PWM mode reference voltage.

According to an exemplary embodiment of the present invention, there is provided a method of controlling a DC-DC converter comprising, working in a burst mode when a load connected to an output terminal of the DC-DC converter is a light load of which a load value is a predetermined threshold value or less, switching a voltage at the output terminal during a period of time when a feedback voltage from the output terminal reaches a high potential reference voltage, generating a switch start signal with frequencies divided by predetermined frequency division values, and switching the voltage at the output terminal in response to the switch start signal; and working in a PWM mode when the load is a heavy load of which the load value is greater than the threshold value, and switching the voltage at the output terminal during a period of time when a ramp wave signal is greater than a difference voltage between the feedback voltage and a predetermined PWM mode reference voltage.

According to an exemplary embodiment of the present invention, there is provided a display device comprising, a display panel provided with data lines and gate lines intersecting each other, and pixels arranged in a matrix; a data driver configured to convert digital video data into data voltages which are supplied for the data lines; a scan driver configured to sequentially supply scan pulses synchronized with the data voltages for the scan lines; a timing controller configured to provide the digital video data to the data driver and control operation timings of the data driver and the scan driver; and a DC-DC converter configured to generate a DC power needed for driving the display panel and supply the DC power for the display panel via an output terminal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 11 is a diagram illustrating an operation example of the frequency conversion unit shown in FIG. 9;

DETAILED DESCRIPTION

Figure 1:
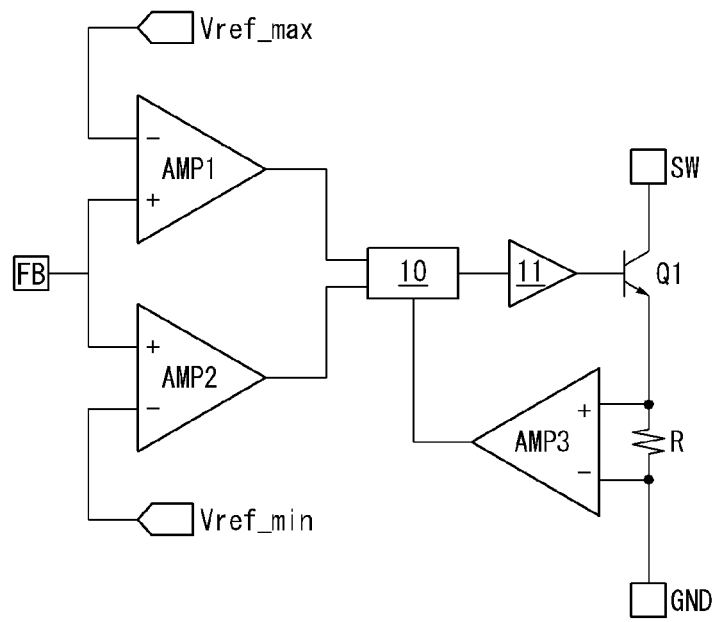
FIG. 1 is a circuit diagram illustrating a burst mode circuit in a DC-DC converter.
Figure 2:
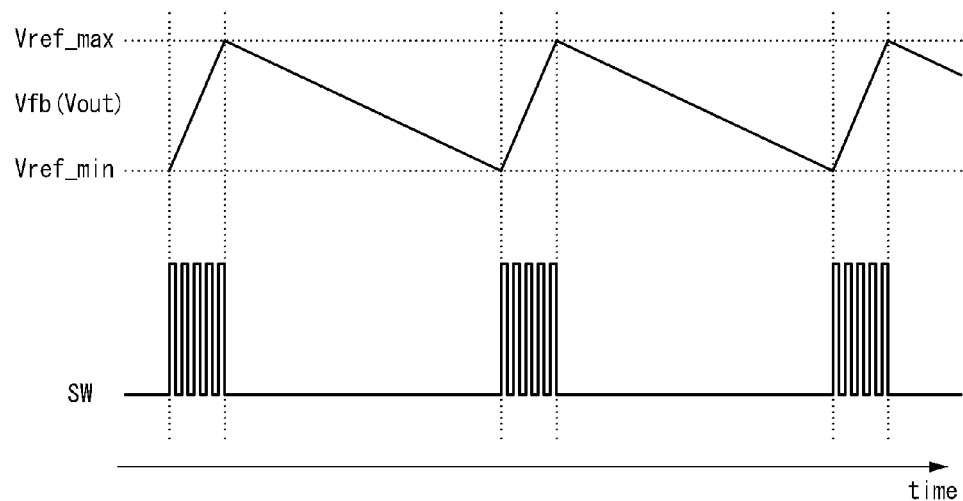
FIG. 2 is a waveform diagram illustrating a voltage at the feedback terminal and a voltage at the switch terminal of the burst mode circuit shown in FIG. 1.
Figure 3:
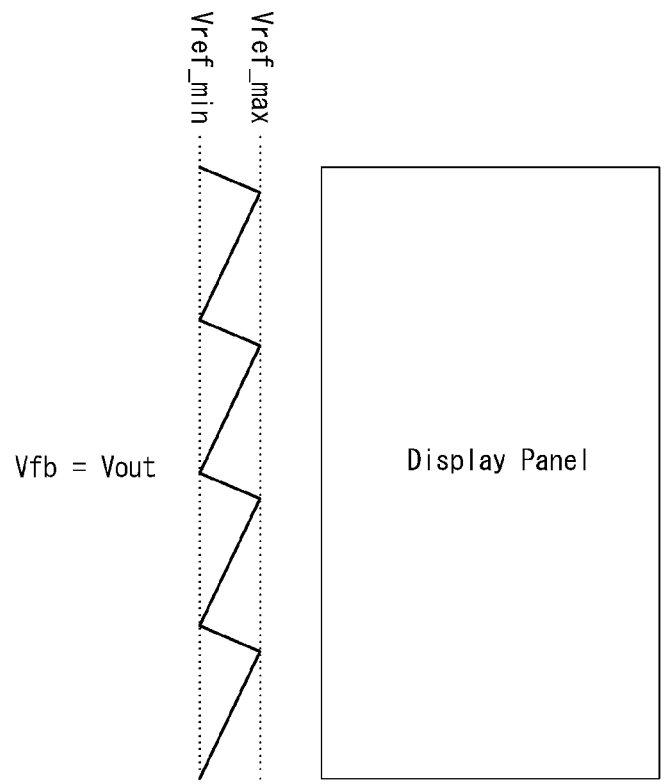
FIG. 3 is a diagram illustrating a screen shaking phenomenon appearing when data corresponding to 30% grayscale is input to an OLED display and the OLED display is driven using an output voltage from the burst mode circuit shown in FIG. 1.
Figure 4:
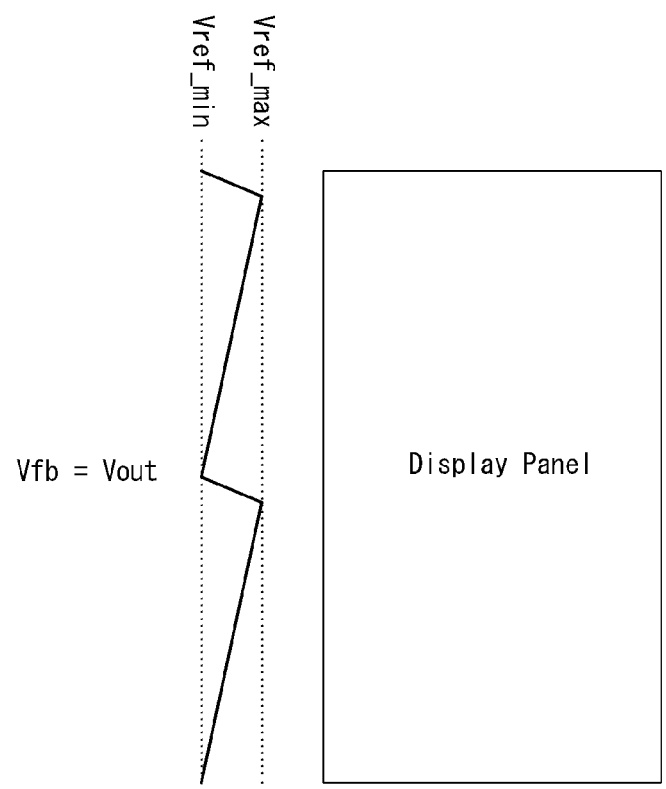
FIG. 4 is a diagram illustrating a screen shaking phenomenon appearing when data corresponding to 10% grayscale is input to an OLED display and the OLED display is driven using an output voltage from the burst mode circuit shown in FIG. 1.
Figure 5:
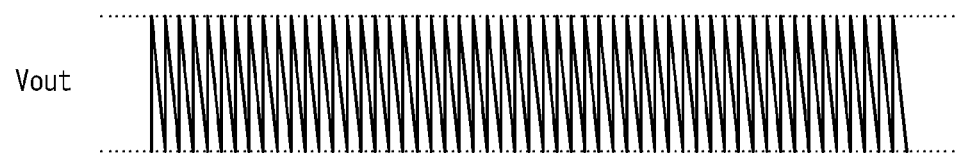
FIGS. 5 to 7 are waveform diagrams illustrating examples of waveforms of which ripple amplitudes of output voltages are the same and frequencies are different from each other.
Figure 6:
Figure 7:

A DC-DC converter according to this document generates a DC power used in a display device. The display device according to this document may include any other display device which is driven using a DC power output from the DC-DC converter. For example, the display device may include, but not limited to, a liquid crystal display (LCD), an organic light emitting diode (OLED) display, an electrophoresis display (EPD), or the like.

With reference to the accompanying drawings, exemplary embodiments of this document will be described by exemplifying an LCD. It is noted that the description of the following embodiments is made principally based on an LCD, but this document is not limited to the LCD. Like reference numerals designate like elements throughout the specification. In the following explanations, when a detailed description of well-known functions or configurations related to this document is determined to unnecessarily cloud a gist of this document, the detailed description thereof will be omitted.

Names of the respective elements used in the following explanations are selected for convenience of writing the specification and may be thus different from those in actual products.

Figure 8:
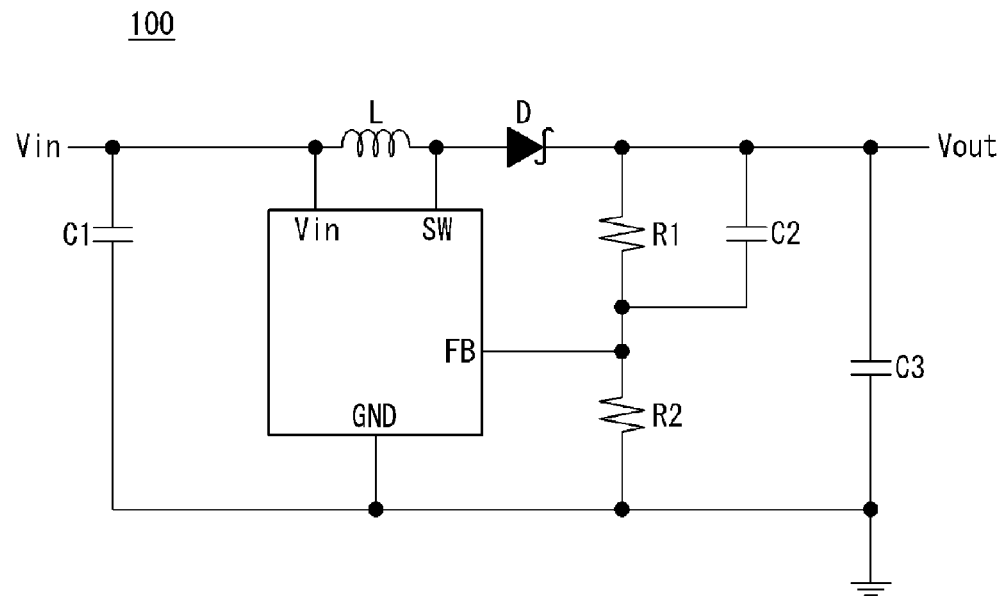
FIG. 8 is a circuit diagram illustrating an appearance of a power IC chip where a DC-DC converter according to an embodiment of this document is integrated.

FIG. 8 is a circuit diagram illustrating an appearance of a power IC chip where a DC-DC converter according to an embodiment of this document is integrated.

Referring to FIG. 8, the DC-DC converter 100 may be implemented by a power IC (integrated circuit) chip form. The power IC chip has a voltage input terminal Vin, a switch terminal SW, a feedback terminal FB, and a ground terminal GND. The voltage input terminal of the power IC chip is applied with a predetermined DC voltage Vin and connected to one end of an inductor L. The switch terminal SW of the power IC chip is connected to the other end of the inductor L and an anode of a zener diode D. The inductor L and a third capacitor C3 form a low pass filter and removes high frequency noise from an output voltage Vout. The switch terminal SW, the diode D, and the third capacitor C3, etc. constitute an output terminal of the DC-DC converter. The output voltage refers to a voltage output via the output terminal and also refers to a voltage at the output terminal. Although not shown, a load such as the display panel is connected to the output terminal. The output voltage Vout is divided by a voltage division resistor circuit R1 and R2, and the divided voltage is input to a feedback terminal FB of the power IC chip. A resistance of the resistor R2 is much greater than that of the resistor R1, and thus a value of the output voltage Vout is almost the same as that that of the feedback voltage. A second capacitor C2 is connected between a cathode of the zener diode D and a voltage division node of the voltage division resistor circuit, and removes noise from the feedback voltage input to the feedback terminal FB.

Figure 9:
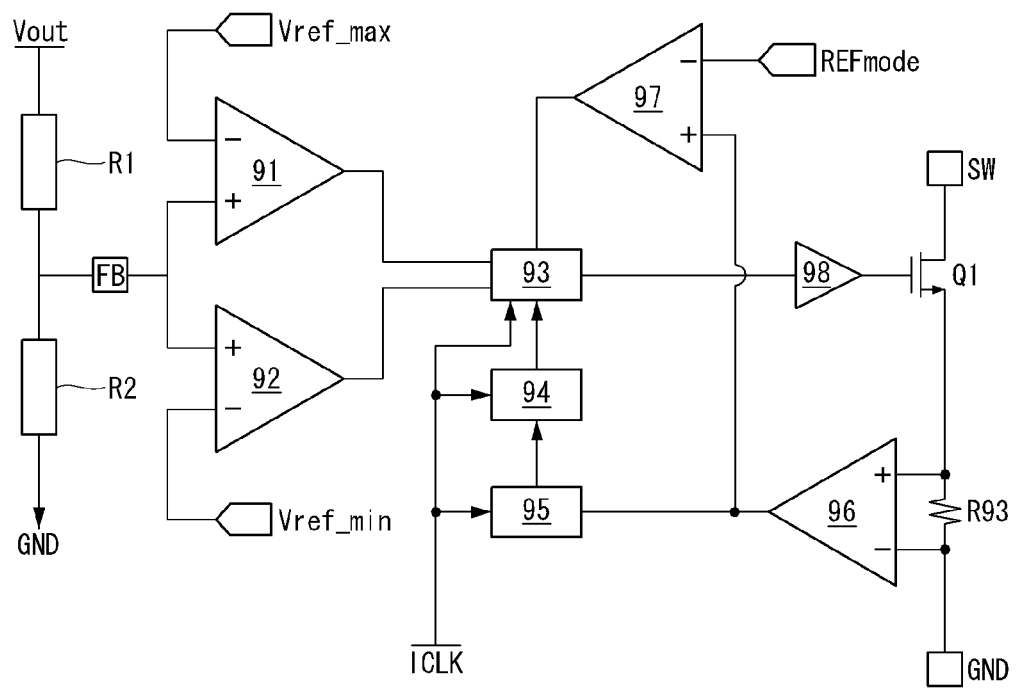
FIG. 9 is a circuit diagram illustrating a burst mode circuit in the DC-DC converter according to the embodiment of this document.
Figure 14:
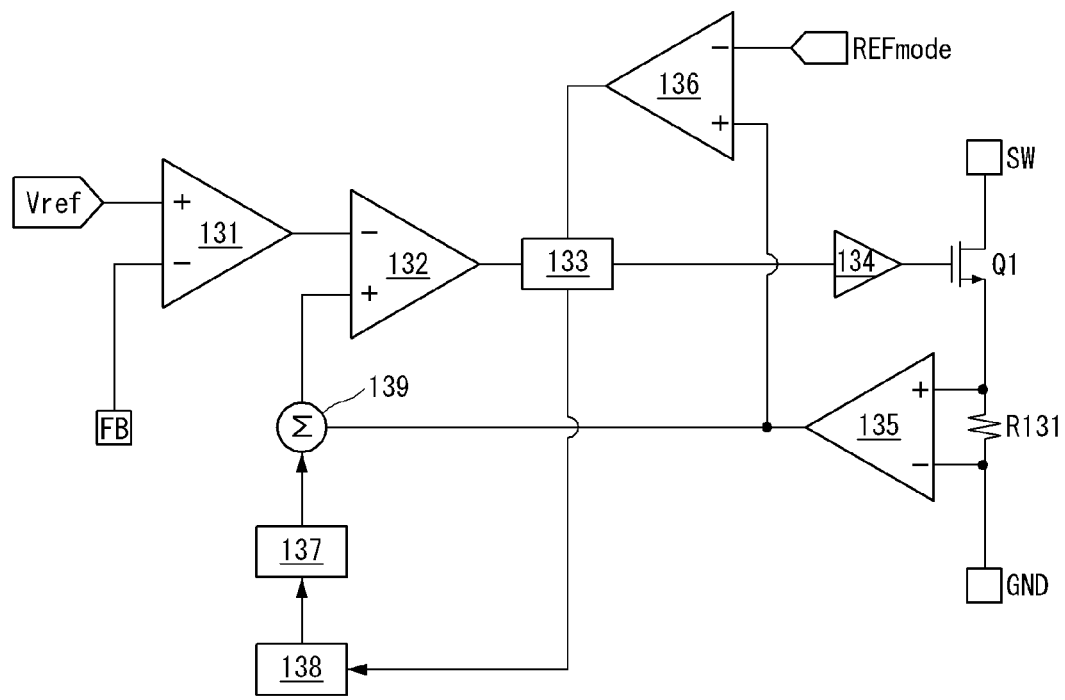
FIG. 14 is a circuit diagram illustrating a PWM mode circuit in the DC-DC converter according to the embodiment of this document.

The power IC chip includes a burst mode circuit as shown in FIG. 9 and a PWM mode circuit as shown in FIG. 14. The burst mode circuit detects a load of a display device, and works when the load of the display device is not present or is a light load as shown in the following Table 1. In contrast, the PWM mode circuit detects the load of the display device, and works when the load of the display device is a heavy load. For example, the burst mode circuit works when the load of the display device is 30% or less, and the PWM mode circuit works when the load of the display device is greater than 30% and 100% or less. A threshold value between the burst mode and the PWM mode may be set at the 30% load.

TABLE 1

| | Load | | |
|---|---|---|---|
| | No Load | Light Load | Heavy Load |
| Mode | Burst Mode | Burst Mode | PWM Mode |

In the DC-DC converter in the related art, a frequency of the output voltage can be made high to a degree where a viewer cannot recognize the screen shaking with naked eyes in the burst mode; however, in this case, the increase in switching losses causes a current consumption loss. Here, the frequency is a value obtained by multiplying a frame frequency by the number of scan lines in the display device. In contrast, the DC-DC converter according to this embodiment employs, in the burst mode, a frequency control method in which a switching frequency is irregularly changed such that a viewer cannot recognize the screen shaking, along with controlling the switching of the output voltage Vout by comparing the feedback voltage with the reference voltages Vref_max and Vref_min similarly to the burst mode in the related art.

Figure 10:
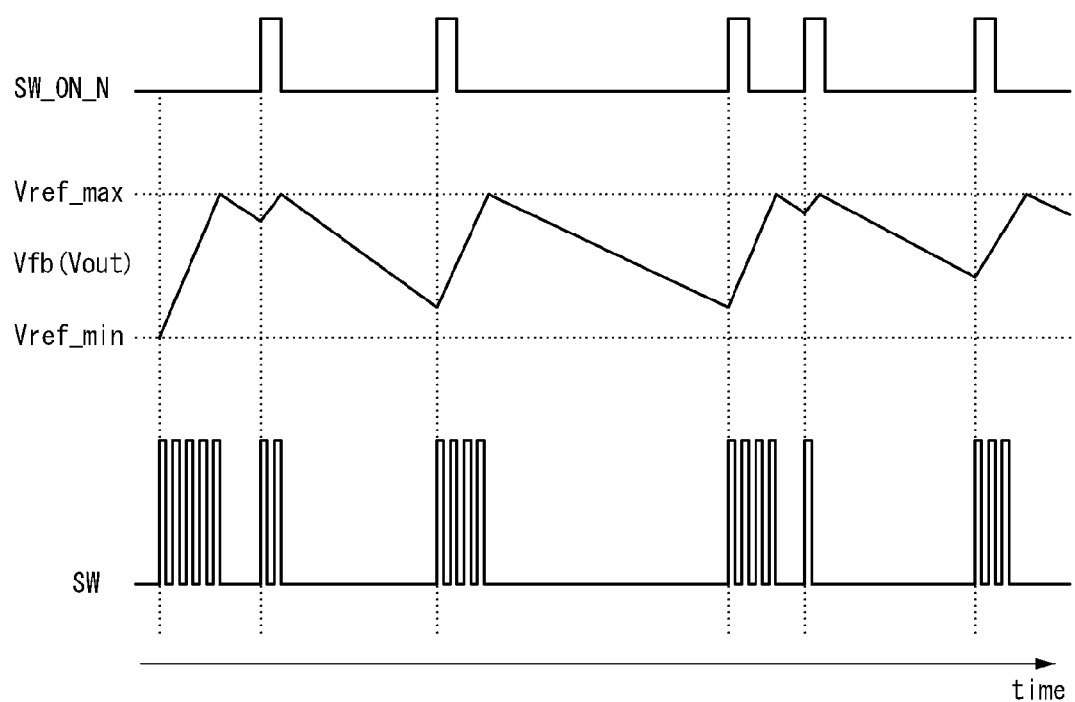
FIG. 10 is a waveform diagram illustrating a switch-on start signal, a voltage at a feedback terminal, a voltage at a switch terminal in the burst mode circuit shown in FIG. 9.

FIG. 9 is a circuit diagram illustrating the burst mode circuit of the DC-DC converter 100. FIG. 10 is a waveform diagram illustrating a switch-on start signal SW_ON_N, a voltage at the feedback terminal, and a voltage at the switch terminal in the burst mode circuit shown in FIG. 9.

Referring to FIG. 9, the burst mode circuit of the DC-DC converter 100 includes first to fourth operational amplifiers 91, 92, 96 and 97, a frequency generation unit 95, a frequency conversion unit 94, a logic unit 93, and a transistor Q1.

The first operational amplifier 91 compares a feedback voltage input to the feedback terminal FB with the high potential reference voltage Vref_max, and generates an output indicating whether the feedback voltage is higher or lower than the high potential reference voltage Vref_max. The second operational amplifier 92 compares a feedback voltage Vfb of an output voltage with the low potential reference voltage Vref_min, and generates an output indicating whether the feedback voltage is higher or lower than the low potential reference voltage Vref_min. The third operational amplifier 96 compares with each other voltages at both ends of a resistor R93 connected between the transistor Q1 and the ground terminal GND so as to detect a current, which varies depending on a load amount, flowing through the transistor Q1, and outputs the detected result to the frequency generation unit 95. The fourth operational amplifier 97 compares a mode reference voltage REFmode with the voltage output from the third operational amplifier 96 and generates an output indicating whether the voltage detecting the output voltage Vout is higher or lower than the mode reference voltage REFmode. That is to say, the third operational amplifier 96 detects a load of the display device by detecting the current at the output terminal which is converted into the voltage.

The frequency generation unit 95 receives a clock signal ICLK with a predetermined frequency and the output from the third operational amplifier 96, and generates a signal of which a frequency varies depending on a load of the display device. The frequency generation unit 95 makes an output frequency higher as the output voltage from the third operational amplifier 96 is greater, that is, a load of the display device is greater. On the other hand, the frequency generation unit 95 makes the output frequency lower as the output voltage from the third operational amplifier 96 is smaller, that is, a load of the display device is smaller. The clock signal ICLK is generated from an oscillator (not shown). The frequency conversion unit 94 divides a frequency of a signal output from the frequency generation unit 95 by the use of predetermined frequency division values, irregularly converts the frequency of the signal, and generates a switch start signal. The frequency of the switch start signal from the frequency conversion unit 94 is given by equation (1).

$$Fnew=Fin/n \quad (1)$$

Where Fnew represents an output frequency of the frequency conversion unit 94, and Fin represents an input frequency of the frequency conversion unit 94. In addition, n is a positive integer equal to or more than 2 and represents a frequency division value.

The switch-on start signal SW_ON_N shown in FIG. 10 is output from an OR gate which performs a logical sum operation for the outputs from the first and second operational amplifiers 91 and 92 and the output from the frequency conversion unit 94. The logic unit 93 repeatedly generates switch-on pulses until the feedback voltage Vfb reaches the high potential reference voltage Vref_max in response to pulses of the switch-on start signal SW_ON_N. In addition, the logic unit 93 repeatedly generates the switch-on pulses until the feedback voltage Vfb reaches the high potential reference voltage Vref_max in response to the switch start signal of which the frequency varies depending on the frequency division values. The logic unit 93 stops generating the switch-on pulses during a period of time when the switch-on start signal SW_ON_N is maintained as a low logic level, that is, a period of time when the feedback voltage Vfb gradually decreases from the high potential reference voltage Vref_max and the switch start signal is not output from the frequency conversion unit 94.

The logic unit 93 receives the output from the fourth operational amplifier 97, and generates an output when a load of the display device lies in a range of a light load. In contrast, the logic unit 93 does not generate the output when a load of the display device lies in a range of a heavy load.

The driving unit 98 includes n type MOSFETs (metal-oxide-semiconductor field-effect transistor) and p type MOSFETs which are connected to each other in a push pull circuit type. The driving unit 98 turns on the transistor Q1 when the output from the logic unit 93 is in a high logic level, whereas it turns off the transistor Q1 when the output from the logic unit 93 is in a low logic level. The transistor Q1 is turned on or off depending on a gate voltage output from the driving unit 98 and regulates the output voltage Vout. A gate terminal of the transistor Q1 is connected to an output terminal of the driving unit 98, and a drain terminal thereof is connected to the switch terminal SW. A source terminal of the transistor Q1 is connected to a non-inverting input terminal of the third operational amplifier 96.

FIG. 11 is a diagram illustrating an operation example of the frequency conversion unit 94 shown in FIG. 9.

In FIG. 11, if the frequency division values in the frequency conversion unit 94 are five and seven, the frequency conversion unit 94 generates outputs in synchronization with the clocks ICLK every multiple of five and seven. The frequency division values in the frequency conversion unit 94 are not limited to five and seven, but may be set to any one positive integer equal to more than 2 or a combination thereof.

Figure 12:
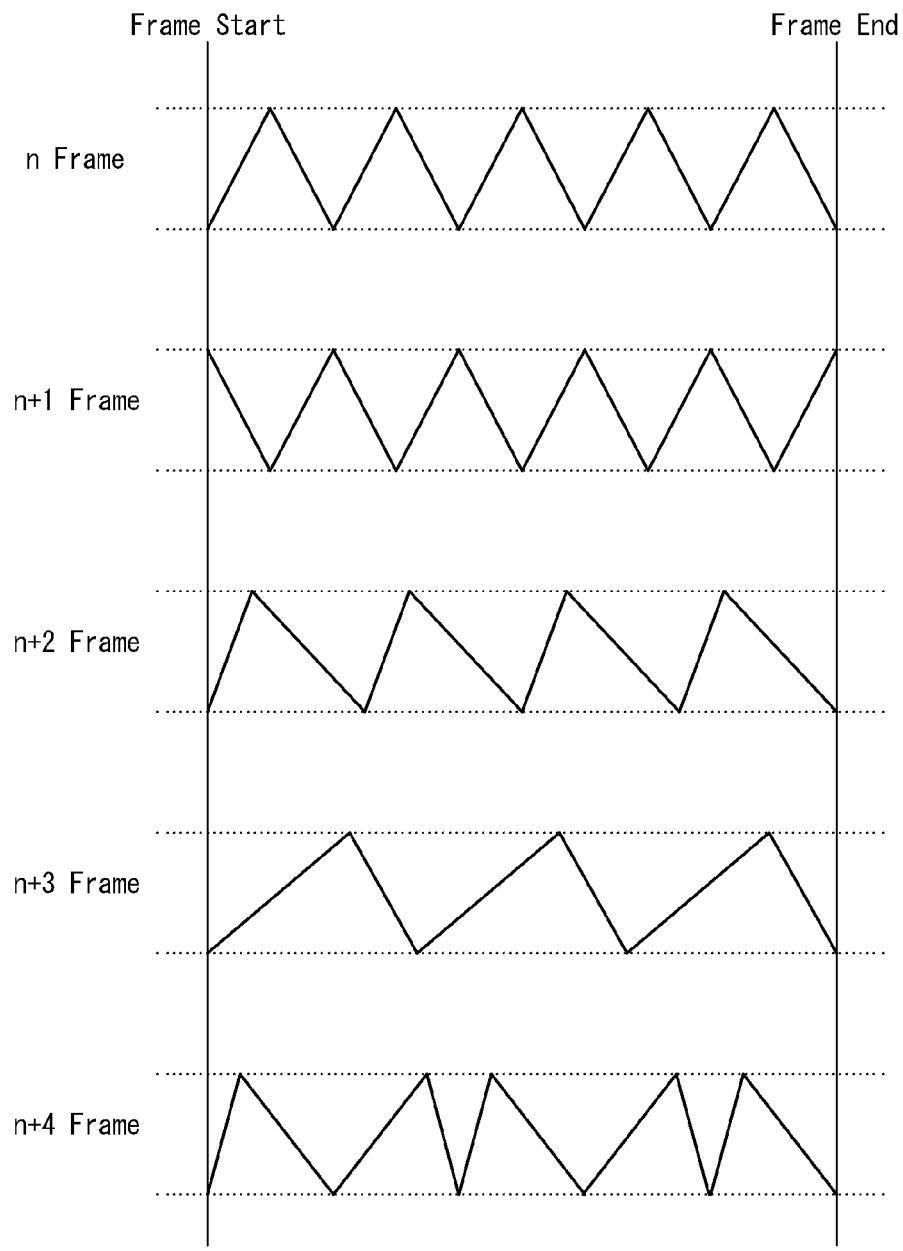
FIG. 12 is a diagram illustrating an example of an output voltage from the burst mode circuit during a number of frame periods.
Figure 13:
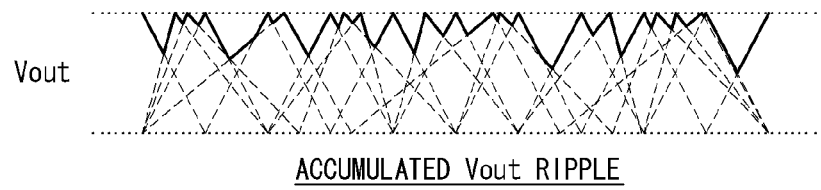
FIG. 13 is a diagram illustrating accumulated voltage ripples in the frequencies shown in FIG. 12.

FIG. 12 is a waveform diagram illustrating waveforms of output voltages from the burst mode circuit during a number of frame periods. FIG. 13 is a diagram illustrating an accumulated voltage ripple in the frequencies shown in FIG. 12.

Referring to FIGS. 12 and 13, the output voltage frequency in the burst mode varies depending on the frequency division values in the frequency conversion unit 94 and the load amount of the display device every frame period. When the output voltages shown in FIG. 12 are accumulated during five frame periods, the switching duration and the non-switching duration irregularly occur. As a result, a viewer hardly recognizes the screen shaking phenomenon when a load of the display devices is a light load and the DC-DC converter works in the burst mode.

FIG. 14 is a circuit diagram illustrating the PWM mode circuit in the DC-DC converter 100 according to an embodiment of this document.

In FIG. 14, the PWM mode circuit in the DC-DC converter 100 includes first to fourth operational amplifier 131, 132, 135 and 136, a frequency generation unit 138, a ramp wave generation unit 137, a logic unit 133, a driving unit 134, and a transistor Q1.

Figure 15:
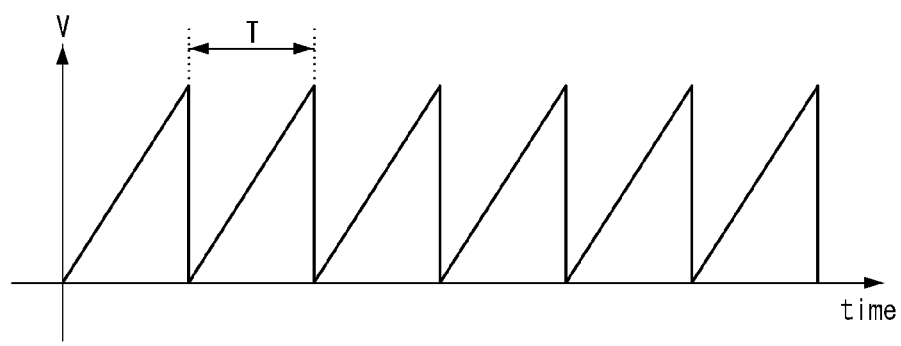
FIG. 15 is a waveform diagram illustrating an example of a ramp wave voltage output from the ramp wave generation unit shown in FIG. 14.
Figure 16:
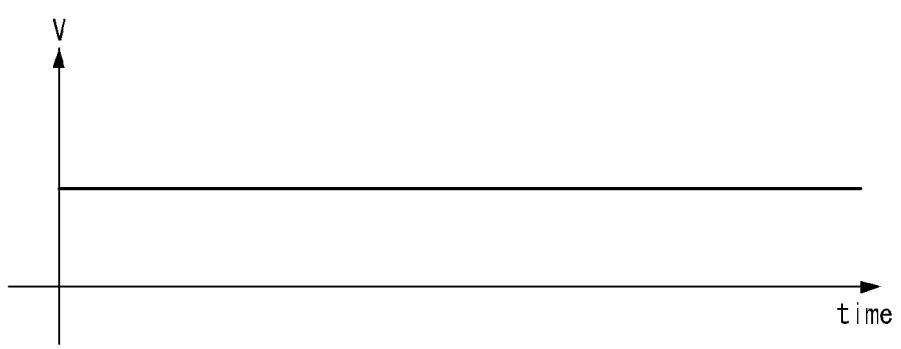
FIG. 16 is a waveform diagram illustrating an example of a gap voltage output from the first operational amplifier shown in FIG. 14.
Figure 17:
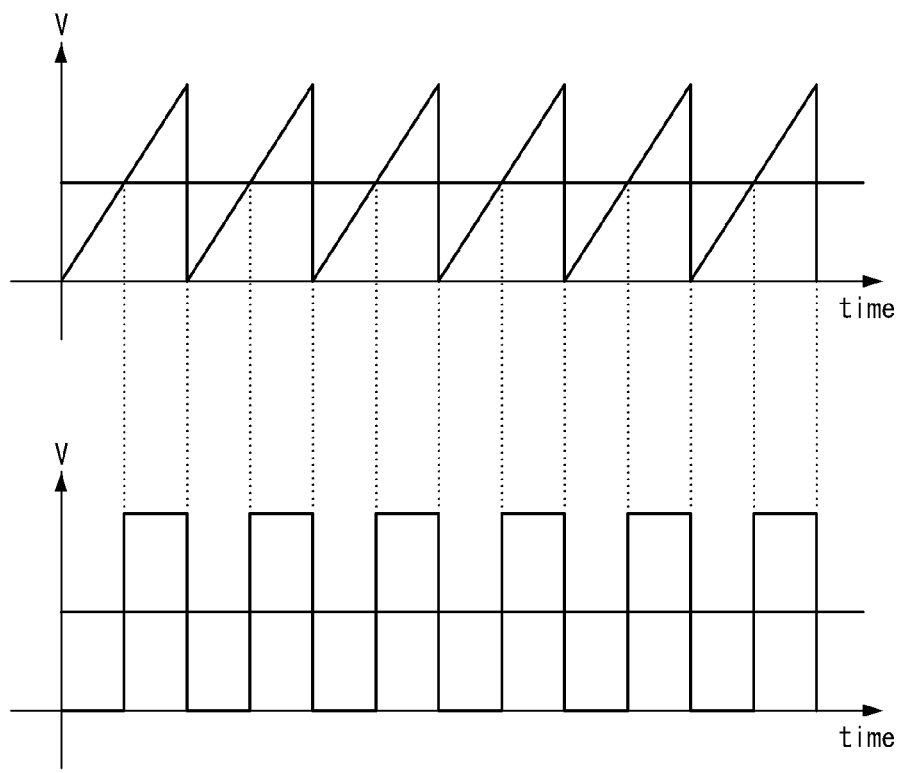
FIG. 17 is a waveform diagram illustrating an example of a switch-on duration signal output from the second operational amplifier.

The first operational amplifier 131 compares a feedback voltage input to the feedback voltage FB with a predetermined reference voltage Vref, and outputs a difference voltage therebetween as a gap voltage GAP. The second operational amplifier 132 compares a ramp wave voltage output from a synthesizer 139 with the gap voltage output from the first operational amplifier 131, and outputs a switch-on duration signal at durations where the ramp wave voltage is higher than the gap voltage. FIG. 15 is a waveform diagram illustrating an example of the ramp wave voltage, and FIG. 16 is a waveform diagram illustrating an example of the gap voltage. FIG. 17 is a waveform diagram illustrating an example of the switch-on duration signal output from the second operational amplifier 132.

The third operational amplifier 135 compares with each other voltages at both ends of a resistor R131 connected between the transistor Q1 and a ground GND so as to detect a current, which varies depending on a load amount, flowing through the transistor Q1, and outputs the detected result to the synthesizer 139. The fourth operational amplifier 136 compares a mode reference voltage REFmode with the output voltage from the third operational amplifier 135 and generates an output indicating whether the voltage detecting the voltage at the output terminal is higher or lower than the mode reference voltage REFmode. The frequency generation unit 138 outputs a signal with a constant frequency in synchronization with the clock signal ICLK under the control of the logic unit 133. The output frequency of the frequency generation unit 138 may vary depending on a frequency control signal output from the logic unit 133. The ramp wave generation unit 137 converts the output signal from the frequency generation unit 138 into the ramp wave signal as shown in FIG. 15 which is output to the synthesizer 139. The synthesizer 139 synthesizes the ramp wave signal from the ramp wave generation unit 137 and the ramp signal from the third operational amplifier 135, and inputs the synthesized signal to a non-inverting terminal of the second operational amplifier 132. An offset voltage of the ramp wave signal output from the synthesizer 139 increases as the output voltage from the third operational amplifier 135 is heightened, that is, a load of the display device increases. The offset voltage of the ramp wave signal output from the synthesizer 139 decreases as the output voltage from the third operational amplifier 135 is lowered, that is, a load of the display device decreases. Thus, the switch-on duration signal output from the second operational amplifier 132 is broadened in its pulse width by the increase in the ramp wave voltage due to a heavy load of the display device, whereas it becomes narrow in its pulse width by the decrease in the ramp wave voltage due to a light load of the display device.

The logic unit 133 repeatedly generates the switch-on pulses at durations where the switch-on duration signal output from the second operational amplifier 132 is in a high logic level. In contrast, the logic unit 133 stops generating the switch-on pulses at durations where the switch-on duration signal from the second operation amplifier 132 is in a low logic level.

The logic unit 133 receives the output from the fourth operational amplifier 136 and generates an output when a load of the display device lies in a range of a heavy load. In contrast, the logic unit 133 does not generate the output when a load of the display device lies in a range of a light load.

The driving unit 134 includes n type MOSFETs and p type MOSFETs which are connected to each other in a push pull circuit type. The driving unit 134 turns on the transistor Q1 when the output from the logic unit 133 is in a high logic level, whereas it turns off the transistor Q1 when the output from the logic unit 133 is in a low logic level. The transistor Q1 is turned on or off depending on a gate voltage output from the driving unit 134 and regulates the output voltage Vout. A gate terminal of the transistor Q1 is connected to an output terminal of the driving unit 134, and a drain terminal thereof is connected to the switch terminal SW. A source terminal of the transistor Q1 is connected to a non-inverting input terminal of the third operational amplifier 135.

Figure 18:
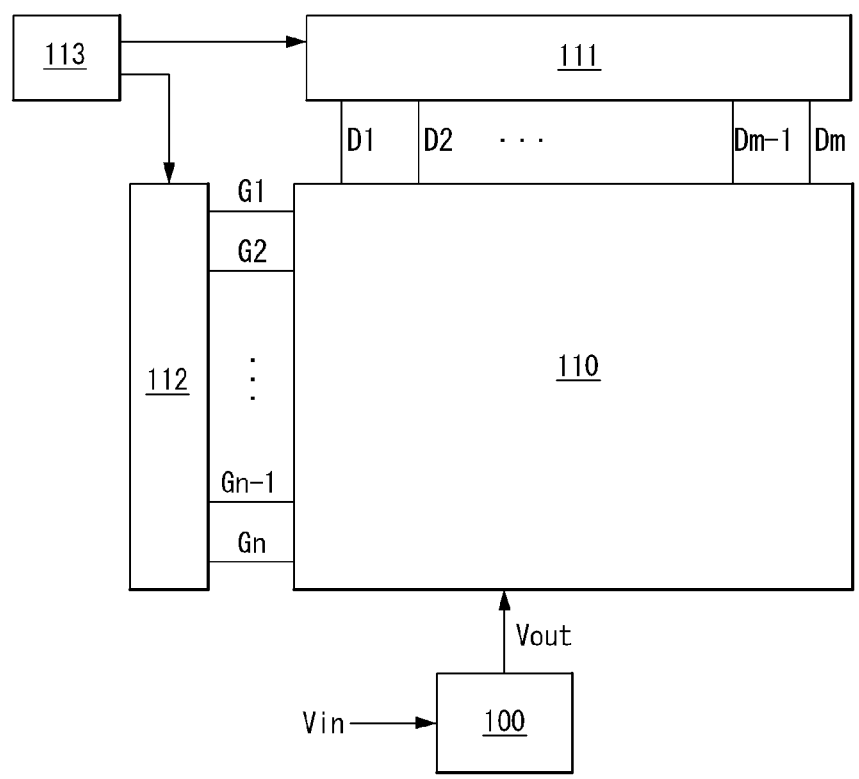
FIG. 18 is a schematic block diagram illustrating a display device according to an embodiment of this document.

FIG. 18 is a block diagram illustrating the display device according to the embodiment of this document.

Referring to FIG. 18, the display device includes a display panel 110, a data driver 111, a scan driver 112, a timing controller 113, and the DC-DC converter 100.

The display panel 110 is provided with data lines D1 to Dm and scan lines G1 to Gn intersecting each other, and pixels arranged in a matrix. The display panel 110 may be implemented by a display panel of any one of an LCD, an OLED display, and an EPD.

The data driver 111 converts digital video data from the timing controller 113 into gamma correction voltages to generate data voltages, and supplies the data voltages for the data lines D1 to Dm. The scan driver 112 sequentially supplies for the scan lines G1 to Gn scan pulses synchronized with the data voltages which are supplied for the data lines D1 to Dm. The timing controller 113 rearranges the digital video data from an external device for transmission to the data driver 111. The timing controller 113 controls operation timings of the data driver 111 and the gate driver 112 by the use of timing signals such as a vertical synchronizing signal Vsync, a horizontal synchronizing signal Hsync, a data enable signal DE, a dot clock DCLK, or the like, which are output from the external device.

The DC-DC converter 100, as described above, works in the burst mode when a load of the display device is a light load, and works in the PWM mode when the load of the display device is a heavy load, and thereby generating the DC voltage Vout needed for driving the display panel 110 for supply to the display panel 110. The DC-DC converter 100 detects the currents flowing through the output terminal using the third operational amplifiers 96 and 135, whereby detecting a load amount of the display panel 110, and selects the burst mode or the PWM mode based on the load amount.

As described above, according to the embodiment of this document, the DC-DC converter not only switches the voltage at the output terminal until the feedback voltage reaches the high potential reference voltage but also switches the voltage at the output terminal when the switch start signal with frequencies divided by predetermined frequency division values is generated. As a result, in the display device which is supplied with a DC power from the DC-DC converter, a display quality is not degraded and a standby power in a light load can be reduced when driven using the DC power.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A DC-DC converter, comprising:
a burst mode circuit configured to work when a load connected to an output terminal of the DC-DC converter is a light load of which a load value is a predetermined threshold value or less; and
a PWM mode circuit configured to work when the load is a heavy load of which the load value is greater than the threshold value,
wherein the burst mode circuit is further configured to:
switch a voltage at the output terminal during a period of time when a feedback voltage from the output terminal reaches a high potential reference voltage;
generate a switch start signal with frequencies divided by predetermined frequency division values; and
switch the voltage at the output terminal in response to the switch start signal,
wherein the PWM mode circuit is further configured to switch the voltage at the output terminal during a period of time when a ramp wave signal is greater than a difference voltage between the feedback voltage and a predetermined PWM mode reference voltage, and
wherein the burst mode circuit comprises:
a first comparator configured to compare the high potential reference voltage with the feedback voltage,
a second comparator configured to compare a low potential reference voltage with the feedback voltage,
a third comparator configured to detect a current between the output terminal and a ground voltage source,
a frequency generation unit configured to generate a signal with frequencies which vary depending on an output from the third comparator;
a frequency conversion unit configured to divide the signal from the frequency generation unit by the use of the frequency division value, generating the switch start signal,
a logic unit configured to output switch-on pulses in response to the switch start signal from the frequency conversion unit during a period of time when the feedback voltage increases to the high potential reference voltage, and
a driving unit configured to control a transistor which switches a current path between the output terminal and the ground voltage source in response to the switch-on pulses from the logic unit.

2. The DC-DC converter of claim 1, wherein the logic unit is further configured to stop generating the switch-on pulses during a period of time when the feedback voltage decreases and the frequency conversion unit does not generate the switch start pulse.

3. The DC-DC converter of claim 2, wherein the burst mode circuit further comprises a fourth comparator configured to compare a predetermined mode reference voltage and an output voltage from the third comparator, outputting a voltage corresponding to a difference between the predetermined mode reference voltage and the output voltage from the third comparator to the logic unit.

4. The DC-DC converter of claim 3, wherein the logic unit is further configured to:
receive the output from the fourth comparator; and
stop generating the switch-on pulses when a load connected to the output terminal is a light load.

5. A method of controlling a DC-DC converter, the method comprising:
working in a burst mode when a load connected to an output terminal of the DC-DC converter is a light load of which a load value is a predetermined threshold value or less, switching a voltage at the output terminal during a period of time when a feedback voltage from the output terminal reaches a high potential reference voltage, generating a switch start signal with frequencies divided by predetermined frequency division values, and switching the voltage at the output terminal in response to the switch start signal; and
working in a PWM mode when the load is a heavy load of which the load value is greater than the threshold value, and switching the voltage at the output terminal during a period of time when a ramp wave signal is greater than a difference voltage between the feedback voltage and a predetermined PWM mode reference voltage,
wherein working in a burst mode comprises:
comparing the high potential reference voltage with the feedback voltage,
comparing a low potential reference voltage with the feedback voltage,
detecting a current between the output terminal and a ground voltage source,
generating a signal with frequencies which vary depending on an output from the current between the output terminal and the ground voltage source,
dividing the signal by the frequency division value, generating the switch start signal,
outputting switch-on pulses in response to the switch start signal during a period of time when the feedback voltage increases to the high potential reference voltage, and controlling a transistor which switches a current path between the output terminal and the ground voltage source in response to the switch-on pulses.

6. A display device, comprising:
a display panel provided with data lines and gate lines intersecting each other, and pixels arranged in a matrix;
a data driver configured to convert digital video data into data voltages which are supplied for the data lines;
a scan driver configured to sequentially supply scan pulses synchronized with the data voltages for the scan lines;
a timing controller configured to:
provide the digital video data to the data driver; and
control operation timings of the data driver and the scan driver; and
a DC-DC converter configured to:
generate a DC power needed for driving the display panel; and
supply the DC power for the display panel via an output terminal,
wherein the DC-DC converter is configured to:
work in a burst mode when a load connected to an output terminal of the DC-DC converter is a light load of which a load value is a predetermined threshold value or less, thereby switching a voltage at the output terminal during a period of time when a feedback voltage from the output terminal reaches a high potential reference voltage, generating a switch start signal with frequencies divided by predetermined frequency division values, and switching the voltage at the output terminal in response to the switch start signal, and
work in a PWM mode when the load is a heavy load of which the load value is greater than the threshold value, switching the voltage at the output terminal during a period of time when a ramp wave signal is greater than a difference voltage between the feedback voltage and a predetermined PWM mode reference voltage, and
wherein the DC-DC converter comprises:
a first comparator configured to compare the high potential reference voltage with the feedback voltage,
a second comparator configured to compare a low potential reference voltage with the feedback voltage,
a third comparator configured to detect a current between the output terminal and a ground voltage source,
a frequency generation unit configured to generate a signal with frequencies which vary depending on an output from the third comparator,
a frequency conversion unit configured to divide the signal from the frequency generation unit by the use of the frequency division value, generating the switch start signal,
a logic unit configured to output switch-on pulses in response to the switch start signal from the frequency conversion unit during a period of time when the feedback voltage increases to the high potential reference voltage, and
a driving unit configured to control a transistor which switches a current path between the output terminal and the ground voltage source in response to the switch-on pulses from the logic unit.

7. The display device of claim 6, wherein the display panel comprises a display panel of any one of a liquid crystal display (LCD), an organic light emitting diode (OLED) display, and an electrophoresis display (EPD).

* * * * *